United States Patent [19]

Ota et al.

[11] Patent Number: 4,744,638

[45] Date of Patent: May 17, 1988

[54] LIQUID CRYSTAL DISPLAY APPARATUS HAVING STABILIZER WITHIN LIGHT SOURCE AND LCD-CONTAINING CASE

[75] Inventors: Makoto Ota, Yokohama; Akira Naito, Machida; Hiroshi Sawamura, Sagamihara, all of Japan

[73] Assignee: Mitsubishi Denki Kabushiki Kaisha, Tokyo, Japan

[21] Appl. No.: 806,900

[22] Filed: Dec. 9, 1985

[30] Foreign Application Priority Data

Dec. 24, 1984 [JP] Japan .......................... 59-195664[U]

[51] Int. Cl.[4] .............................................. G02F 1/13

[52] U.S. Cl. ................................ 350/345; 350/331 R; 350/334

[58] Field of Search .................... 350/331 R, 334, 345

[56] References Cited

U.S. PATENT DOCUMENTS 4,330,813 5/1982 Deutsch .......................... 350/345 X
4,487,481 12/1984 Suzawa .............................. 350/345
4,578,672 3/1986 Oota et al. ...................... 350/345 X
4,659,183 4/1987 Suzawa .............................. 350/345

FOREIGN PATENT DOCUMENTS 0030875 6/1981 European Pat. Off. .
0089378 9/1983 European Pat. Off. .
2098374 11/1982 United Kingdom .

OTHER PUBLICATIONS

SID International Symposium, 1984, Digest of Technical Papers, Jun. 1984, edition 1, pp. 51–54, Palisades Institute for Research Services, Inc., New York.

*Primary Examiner*—Stanley D. Miller
*Assistant Examiner*—Richard F. Gallivan
*Attorney, Agent, or Firm*—Armstrong, Nikaido, Marmelstein & Kubovcik

[57] ABSTRACT

A display apparatus having a plurality of display units arranged contiguously so as to form mosaic patterns on the display apparatus by varying in the contents of display according to control signals given thereto. The display unit includes a fluorescent lamp, a display element, a fluorescent lamp stabilizer, a glow lamp for lighting the fluorescent lamp, and a case. All these components of the display unit are accommodated in the case, so that the display apparatus is formed in a compact construction and the electronic circuits of the display units are not disturbed by noises attributable to the current flowing through the cables connecting the fluorescent lamp stabilizers to the fluorescent lamps, respectively.

3 Claims, 3 Drawing Sheets

LIQUID CRYSTAL DISPLAY APPARATUS HAVING STABILIZER WITHIN LIGHT SOURCE AND LCD-CONTAINING CASE

BACKGROUND OF THE INVENTION

The present invention relates to a display apparatus comprising a plurality of display units each having a fluorescent lamp and a liquid crystal display element, and fluorescent lamp stabilizers connected to the fluorescent lamps, respectively, and, more particularly, to a display apparatus having a compact construction in which the fluorescent lamp stabilizers are incorporated into the display units, respectively.

Referring to FIG. 4 showing a conventional liquid crystal display unit designated generally by a reference character 1, there are shown a liquid crystal display element 2, a case 3 holding the liquid crystal display element 2, a flexible circuit board 4 which transmits a signal for driving the liquid crystal display element 2, a fluorescent lamp 5 disposed behind the liquid crystal display element 2 for irradiating the liquid crystal display element 2, a socketed harness 6 for connecting the fluorescent lamp to a power source, a connector 6*a*, a cable 6*b*, a connector A 6*c* for connecting the liquid crystal display apparatus, namely, a large picture display apparatus, to the power source of the fluorescent lamp, a backboard 7 for controlling the signal to be given to the liquid crystal display element 2, and a connector B 7*a* provided on the backboard 7 for transmitting control signals to the large picture display apparatus.

Referring to FIG. 5 showing the general constitution of a conventional liquid crystal display apparatus, there are shown a box 8 accommodating a plurality of the liquid crystal display units 1, stabilizer cabinets 9 accommodating fluorescent lamp stabilizers, not shown, and glow lamps, not shown, connection cable 10 connecting the stabilizer cabinets 9 to the liquid crystal display units 1, and a power source which supplies power to the fluorescent lamp stabilizers, not shown, accommodated in the stabilizer cabinets 9.

FIG. 6 is a sectional view of the liquid crystal display unit 1 taken along line VI—VI of FIG. 4. In FIG. 6, there are shown reflecting plate 3*a* for reflecting the light emitted by the fluorescent lamp 5, a diffusion plate 3*b* disposed within the case 3 for uniformly diffusing the light emitted by the fluorescent lamp 5, and a glass plate 3*c* incorporated into the case 3 so as to hold the liquid crystal display element 2.

The conventional liquid crystal display unit 1 is constituted as illustrated in FIGS. 4 to 6. The light emitted by the fluorescent lamp 5 is reflected by the reflecting plate 3*a*, and then falls on the liquid crystal display element 2 after being uniformly diffused by the diffusion plate 3*b*. A control signal for controlling the image on the large picture display apparatus is given through the connector B 7*a* to the backboard 7, and then is transmitted through the flexible circuit board 4 to the liquid crystal display element 2 to drive the liquid crystal display element 2. The transmissivity of the liquid crystal display element 2, hence the contents of display on the surface of the liquid crystal display element 2, changes according to the control signal. The large picture display apparatus has a large display surface consisting of the liquid crystal display units 1 each being capable of changing the contents of display in the above-mentioned manner.

In the above-mentioned liquid crystal display apparatus having a plurality of the liquid crystal display units employing fluorescent lamps as light sources, the stabilizers and glow lamps for lighting the fluorescent lamps are disposed apart from the principal unit of the liquid crystal display apparatus in separate units. Therefore, an additional space is necessary for accommodating the stabilizers and glow lamps. Furthermore, since the stabilizers and the glow lamps are disposed apart from the principal unit of the liquid crystal display apparatus, many long cables are necessary for connecting the stabilizers and the glow lamps to the corresponding fluorescent lamps 5. Consequently, the interior of the liquid crystal display apparatus is crowded with the complicated arrangement of the long cables and the associated parts, and hence the cables transmitting high-voltage power are liable to generate noises that causes troubles in the electronic circuits of the liquid crystal display units 1.

SUMMARY OF THE INVENTION

Accordingly, it is an object of the present invention to provide a display apparatus including a plurality of display units each provided with a fluorescent lamp stabilizer disposed within the case thereof, having a short cable for connecting the fluorescent lamp stabilizer to the fluorescent lamp to reduce noises generated by the cable, and capable of displaying images of improved quality.

According to the present invention, the fluorescent lamp stabilizer of each liquid crystal display unit is disposed within the case of the liquid crystal display unit and connected to the fluorescent lamp with a short cable. Accordingly, noises attributable to the current flowing through long cables are reduced and the liquid crystal display apparatus can be formed in a compact construction, because any additional space for accommodating the fluorescent lamp stabilizers is unnecessary.

The above and other objects, features and advantages of the present invention will become more apparent from the following description of a preferred embodiment thereof taken in conjunction with the accompanying drawings.

DESCRIPTION OF THE PREFERRED EMBODIMENT

Figure 1:
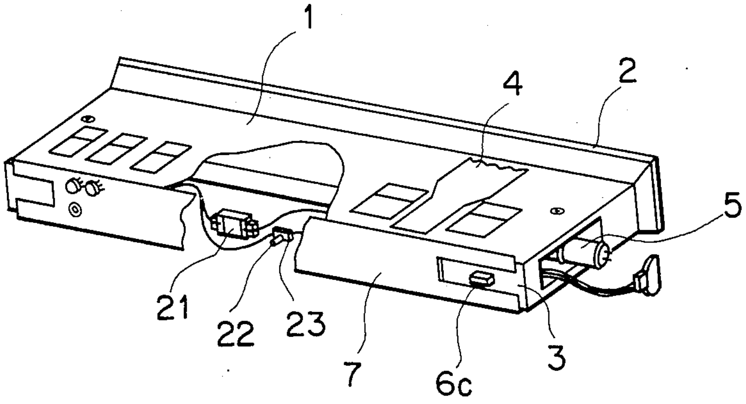
FIG. 1 is a partially broken perspective view of a liquid crystal display unit, namely, an essential component of a liquid crystal display apparatus, according to the present invention.

A preferred embodiment of the present invention will be described in connection with the accompanying drawings hereinafter. In the drawings, like reference characters designate like or corresponding parts throughout. The description of parts the same as those of the above-mentioned conventional liquid crystal display unit will be omitted in the description of the preferred embodiment.

In FIG. 1, there are shown a fluorescent lamp stabilizer 21 held within a case 3, and a glow lamp 22 and a glow lamp holder 23 forming a fluorescent lamp circuit and disposed within the case 3.

A power supply cable, not shown, extending from a power unit, not shown, is connected to a connector A 6c to supply power to the fluorescent lamp stabilizer 21. A fluorescent lamp 5 is lighted by the agency of the glow lamp 22 to irradiate a liquid crystal display element 2. On the other hand, a control signal transmitted to a backboard 7 is applied through a flexible circuit board 4 to the liquid crystal display element 2 to drive the same. The transmissivity of the liquid crystal display element 2 varies according to the control signal given thereto. The light emitted by the fluorescent lamp 5 is transmitted through the liquid crystal display element 2 to form a part of the display on a large liquid crystal display apparatus comprising a plurality of the liquid crystal display units.

According to the present invention, the fluorescent lamp stabilizer 21 is disposed within the case 3 near the corresponding fluorescent lamp 5 and is connected to the fluorescent lamp 5 with a short cable as compared with the cable used in the conventional liquid crystal display unit, and hence noises attributable to the current flowing through the cable are reduced accordingly. Furthermore, since the fluorescent lamp stabilizer 21 is disposed within the case 3, any additional space for the fluorescent lamp stabilizer is not necessary.

Figure 2:
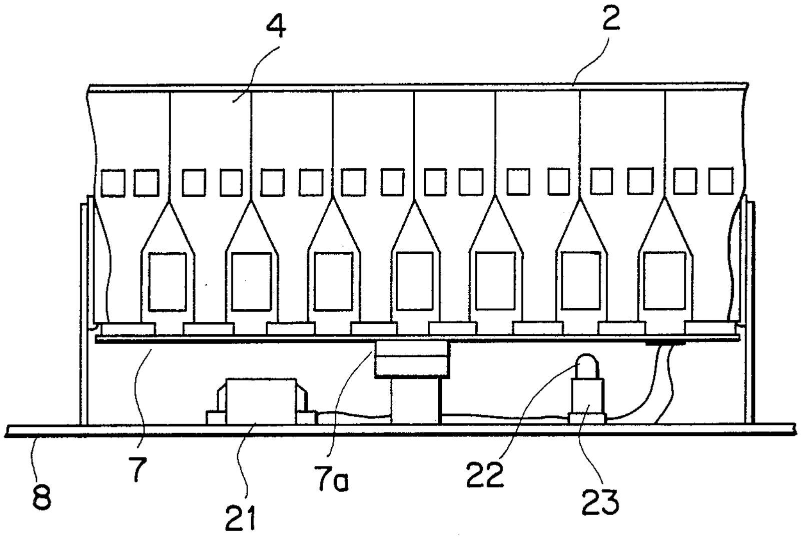
FIG. 2 is a view showing a modification of the liquid crystal display unit according to the present invention.

In this embodiment, the fluorescent lamp stabilizer 21 and the glow lamp 22 are disposed within the case 3 of the corresponding liquid crystal display unit 1, however, it is also possible, for the same effect, to dispose the fluorescent lamp stabilizer 21 and the glow lamp 22 of the fluorescent lamp 5 of each liquid crystal display unit 1 within the box 8 of the liquid crystal display apparatus as shown in FIG. 2.

Figure 3:
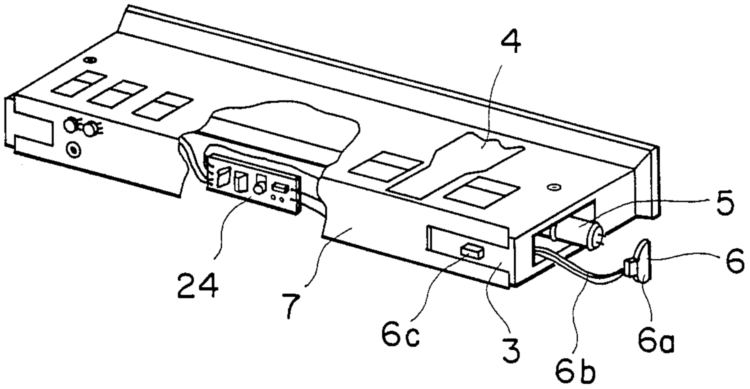
FIG. 3 is a perspective view of another modification of the liquid crystal display unit according to the present invention.
Figure 4:
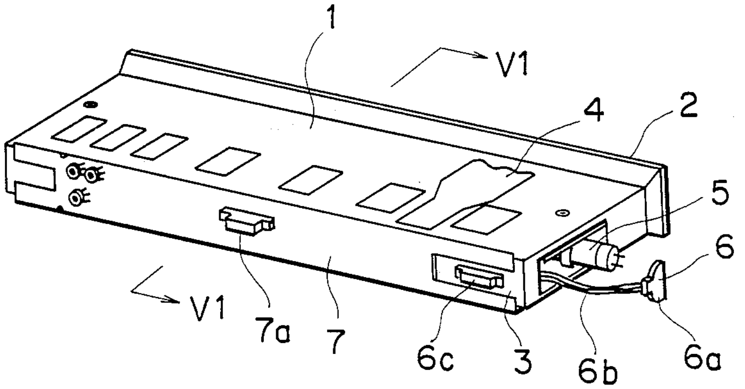
FIG. 4 is a perspective view of a liquid crystal display unit, namely, an essential component of a prior art liquid crystal display apparatus.
Figure 5:
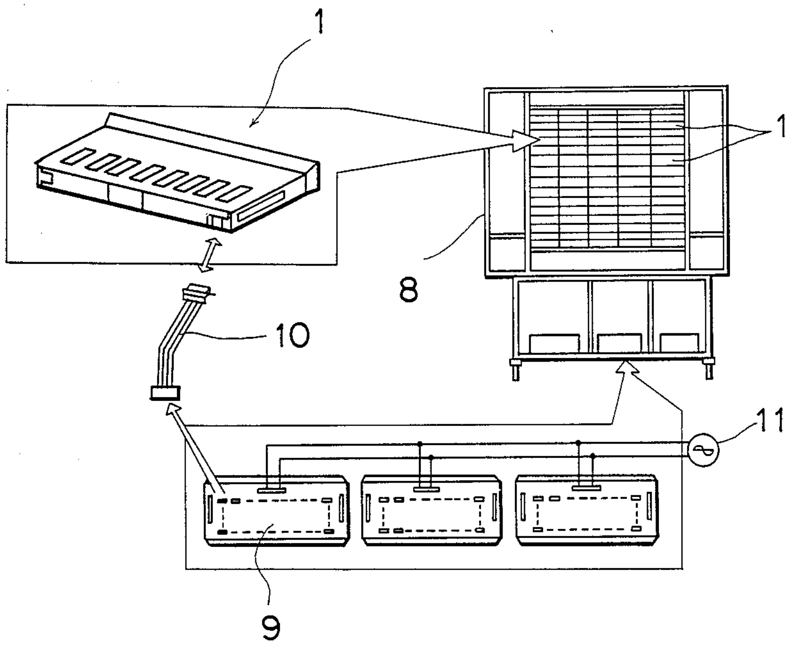
FIG. 5 is a view showing the constitution of a prior art liquid crystal display apparatus.
Figure 6:
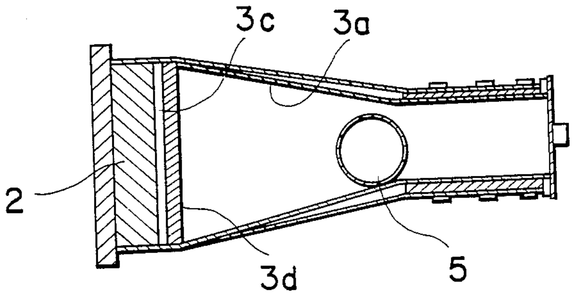
FIG. 6 is a sectional view taken along line VI—VI of FIG. 4.

Furthermore, it is also possible, for the same effect, to provide an electronic ballast in the form of a semiconductor stabilizer 24 in the liquid crystal display unit 1 as shown in FIG. 3.

Still further, it is possible to employ any display element instead of the liquid crystal display element, provided that the transmissivity of the display element is controllable.

As apparent from the foregoing description of the preferred embodiment, according to the present invention, the fluorescent lamp stabilizer is disposed within the case of each liquid crystal display unit, therefore, any additional space for disposing the fluorescent lamp stabilizer is not necessary and the noise attributable to the current flowing through the cables can be reduced.

Although the invention has been described in its preferred form with a certain degree of a particularity, it is to be understood that many changes and variations in the invention are possible without departing from the scope and spirit thereof.

What is claimed is:

1. A display apparatus comprising: a plurality of display units forming a display section, each display unit including a fluorescent lamp, a display element capable of transmitting light emitted by said fluorescent lamp, means varying the transmissivity of said display element in response to an input signal provided thereto, a stabilizer for stabilizing said fluorescent lamp, a case accommodating said fluorescent lamp, said stabilizer and said display element and a box supporting said plurality of display units.

2. A display apparatus according to claim 1, wherein said display elements are liquid crystal display elements.

3. A display apparatus according to claim 1, wherein said stabilizer is an electronic ballast.

* * * * *